United States Patent [19]
Furukawa et al.

[11] 3,872,055
[45] Mar. 18, 1975

[54] POLYAMIDE COMPOSITION HAVING DECREASED GEL-FORMING PROPERTY IN MOLTEN STATE

[75] Inventors: Kaoru Furukawa; Chiaki Isukamoto; Hiroshi Nagai, all of Otsu, Japan

[73] Assignee: Toyo Boseki Kabushiki Kaisha, Osaka, Japan

[22] Filed: Aug. 15, 1973

[21] Appl. No.: 388,698

[30] Foreign Application Priority Data
Aug. 19, 1972 Japan.............................. 47-83118
Sept. 7, 1972 Japan.............................. 47-89853
Sept. 27, 1972 Japan.............................. 47-97558

[52] U.S. Cl.. 260/45.7 P, 260/45.7 R, 260/45.85 T, 260/45.9
[51] Int. Cl............................................. C08g 51/60
[58] Field of Search...... 260/45.7 P, 45.7 R, 45.9 R, 260/45.85 T, 78 R

[56] References Cited
UNITED STATES PATENTS

| | | | |
|---|---|---|---|
| 2,884,414 | 4/1959 | Indest et al. ........................ | 260/78 |
| 2,906,726 | 9/1959 | FitzGerald et al. ................ | 260/45.7 |
| 3,202,622 | 8/1965 | Scullin et al. ...................... | 260/45.7 |
| 3,240,751 | 3/1966 | Cannon et al. ..................... | 260/45.7 |
| 3,260,697 | 7/1966 | Babler............................... | 260/45.7 |
| 3,274,151 | 9/1966 | Settele .............................. | 260/45.7 |
| 3,384,615 | 5/1968 | Agouri et al. ...................... | 260/45.7 |
| 3,533,986 | 10/1970 | Davy................................. | 260/45.7 |
| 3,595,829 | 7/1971 | Davy................................. | 260/45.7 |
| 3,640,970 | 2/1972 | Ozawa et al. ..................... | 260/78 |
| 3,692,867 | 9/1972 | Mayer et al...................... | 260/45.7 |

Primary Examiner—Eugene C. Rzucidlo
Attorney, Agent, or Firm—Kaufman & Kramer

[57] ABSTRACT

A polyamide composition having a decreased gel-forming property in a molten state which comprises a polyamide, (A) at least one phosphorous compound selected from the group consisting of (1) phosphinic acid compounds of the formula:

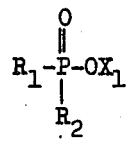

(2) phosphonous acid compounds of the formula:

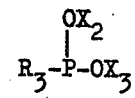

(3) phosphonic acid compounds of the formula:

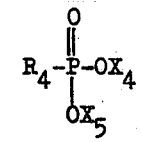

and (4) phosphorous acid compounds of the formula:

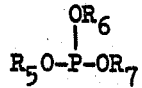

and (B) at least one alkali metal compound of the formula:

$$Z-OR_8$$

, the amount of the component (A) being 50 to 1,000 ppm (in terms of phosphorus) based on the weight of the polyamide and the amount of the component (B) being 1 to 5 mole (in terms of alkali metal) per 1 mole of the component (A) [wherein $R_1$ to $R_7$ are each hydrogen, alkyl, aryl or cycloalkyl, $R_8$ is hydrogen, alkyl, aryl, cycloalkyl or a group of the formula:

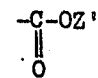

(in which Z' is hydrogen or alkali metal), $X_1$ to $X_5$ are each hydrogen, alkyl, aryl, cycloalkyl or alkali metal and Z is alkali metal, and one of $R_1$ to $R_7$ and one of $x_1$ to $X_5$ may be linked together to form a ring].

6 Claims, No Drawings

POLYAMIDE COMPOSITION HAVING DECREASED GEL-FORMING PROPERTY IN MOLTEN STATE

DETAILED DISCLOSURE

The present invention relates to a polyamide composition having a markedly decreased gel-forming property in a molten state. More particularly, it relates to a polyamide composition, especially of the diamine-dicarboxylic acid type, prevented from gelation by thermal degradation.

In general, polyamides, especially of the diamine-dicarboxylic acid type, such as polyhexamethylene adipamide and polyxylylene adipamide are poor in thermal stability in a molten state. When kept at a high temperature for a long duration even in an oxygen-free system, they transform into a substance of three dimensional network structure, which is nonfusible. The presence of such substance in a normal polymer even in a smallest amount is known to exert bad influences upon smooth operations in the industrial production such as polymerization, spinning, stretching and molding. Therefore, the effective prevention of such gelation of molten polyamides has been highly desired, and various attempts have been already made for this purpose. Many of these attempts, however, only provide methods for prevention of thermal oxidation of polyamides at temperatures below their melting points in an oxygen-containing system. Thus, the prevention of gelation of polyamides by thermal degradation is almost impossible at temperatures higher than their melting points in an oxygen-free system.

On the other hand, there have been proposed some additives to be incorporated into polyamides such as pyrophosphites, organic phosphinic acid amides, magnesium salts of phosphorous acid mono- or diesters, barium salts of phosphorous acid or orthophosphoric acid mono- or diesters, copper salts of orthophosphoric acid mono- or diesters and the like for prevention of their gelation by thermal degradation in a molten state in an oxygen-free system [Japanese Pat. Nos. 11836/70, 35667/70, 12986/70, 38351/70, 38352/70, etc. ]. However, by the incorporation of these additives, there are sometimes caused undesirable results such as the increase of the viscosity of the polymer and the intense foaming and insufficient miscibility between the polymer and the additive. In addition, as to their gelation inhibiting effects, any appreciable difference is not observed comparing the case of using no additive, or even if observed, the gelation time is prolonged only 1.2 to 1.5 times so that any sufficient and effective prevention of the gelation cannot be expected.

Further, there has been proposed the incorporation of a phosphorus compound and an alkali metal halide in polyamides. The addition of such additives only improves the thermal resistance at a strong elongation in the molded products of the polyamides such as fibers but any effect for the prevention of the gelation of the molten polyamide cannot be obtained.

A main object of the present invention is to provide a composition of a polyamide, especially of a diamine-dicarboxylic acid type polyamide, having a greatly decreased gel-forming property. Another object of this invention is to improve the thermal stability of a diamine-dicarboxylic acid type polyamide in a molten state which is poor in thermal stability and forms readily the gel even in an oxygen-free system and thereby to prevent their gelation. A further object of the invention is to provide additives to be incorporated in a polyamide, particularly of the diamine-dicarboxylic acid type, which can markedly prolong the gelation time of the polymer in a molten state, comparing with conventional additives, and are sufficiently miscible with the polymer, not accompanied by increase in the viscosity or the occurrence of foaming. These and other objects of the invention will become apparent from the following descriptions.

According to the invention, a polyamide composition having a decreased gel-forming property can be obtained by incorporating into a polyamide (A) at least one phosphorous compound selected from the group consisting of (1) phosphinic acid compounds of the formula:

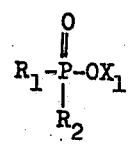

(2) phosphonous acid compounds of the formula:

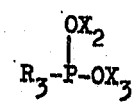

(3) phosphonic acid compounds of the formula:

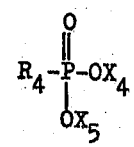

and (4) phosphorous acid compounds of the formula:

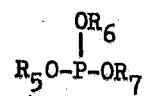

and (B) at least one alkali metal compound of the formula:

optionally together with (C) at least one dicarboxylic acid cyclic anhydride of the formula:

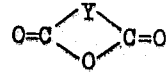

and/or its hydrolyzed product and/or (D) at least one o-phenylenediamine and/or its derivative, the amount of the component (A) being 50 to 1,000 ppm (in terms of phosphorous) based on the weight of the polyamide, the amount of the component (B) being 1 to 5 mole (in terms of alkali metal) per 1 mole of the component (A), the amount of the component (C) being 0.01 to 2 % by weight based on the weight of the polyamide and the amount of the component (D) being 0.01 to 2 % by weight based on the weight of the polyamide.

In the above formulae, $R_1$ to $R_7$ are each hydrogen, alkyl, aryl or cycloalkyl, $R_8$ is hydrogen, alkyl, aryl, cycloalkyl or a group of the formula:

(in which Z' is hydrogen or alkali metal), $X_1$ to $X_5$ are each hydrogen, alkyl, aryl, cycloalkyl or alkali metal and Z is alkali metal, and one of $R_1$ to $R_7$ and one of $X_1$ to $X_5$ may be linked together to form a ring. Further, Y is a group of the formula:

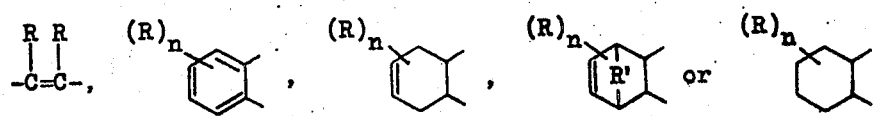

(in which Rs are each same or different and hydrogen, alkyl, substituted alkyl, aryl, cycloalkyl, halogen, nitro or hydroxyl, R' is alkylene and n is an integer of 1 to 4).

The polyamide to which the present invention is applied may be of the diamine-dicarboxylic acid type. Specific examples are polyhexamethylene adipamide, polyhexamethylene sebacamide, polyxylylene adipamide, polyxylylene sebacamide, polyhexamethylene isophthalamide, polyparaxylylene dodecamide, polycyclohexanebismethylene dodecamide, etc. Their copolymers and blends are also utilizable.

Generally, the gelation of a polyamide is supposed to be caused by a mechanism that the terminal amino groups of the molecule react each other to form a secondary amine with the elimination of ammonia, and from this bridging point of the amine, the network structure is produced between molecules. The presence of such secondary amines has confirmed in the analysis of the gelled polymer. In the polyamide composition of the invention, the phosphorus compound (A) has an effect to stabilize the terminal amino groups of the polymer and to prevent their reaction to form a secondary amine. By the sole incorporation of the phosphorus compound (A), some inhibiting effect of gel formation can be obtained, but the effect is markedly increased in the presence of the alkali metal compound (B).

As the phosphorus compound (A), there may be exemplified phosphinic acid compounds such as dimethylphosphinic acid, phenylmethylphosphinic acid, a compound of the formula:

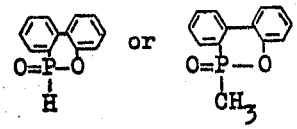

and their hydrolyzates and condensates, phosphonous acid compounds such as phenylphosphonous acid, sodium phenylphosphonite, potassium phenylphosphonite, lithium phenylphosphonite, ethyl phenylphosphonite, hypophosphorous acid, sodium hypophosphite, potassium hypophosphite, lithium hypophosphite and ethyl hypophosphite, phosphonic acid compounds such as phenylphosphonic acid, ethylphosphonic acid, sodium phenylphosphonate, lithium phenylphosphonate, potassium phenylphosphonate, diethyl phenylphosphonate, sodium ethylphosphonate and potassium ethylphosphonate, phosphorous acid compounds such as phosphorous acid, monosodium hydrogenphosphite, disodium hydrogenphosphite, triethyl phosphite, triphenyl phosphite and pyrophosphorous acid, etc. Usually, the use of hypophosphorous acid, sodium hypophosphite, potassium hypophosphite or the like is favorable.

As the alkali metal compound (B), there may be employed sodium hydroxide, sodium methoxide, sodium ethoxide, sodium propoxide, sodium butoxide, potassium methoxide, lithium methoxide, sodium carbonate or the like.

The amount of the component (A) to be incorporated in the polyamide may be in a range of 50 to 1,000 ppm, favorably of from 100 to 500 ppm by weight in terms of phosphorus to the polyamide. When the amount is smaller than 50 ppm by weight, a sufficient inhibiting effect of gel-formation cannot be obtained. When the amount is larger than 1,000 ppm by weight, the inhibiting effect of gel-formation is not increased any more so that the use of such a large amount of the phosphorus compound is uneconomical.

The component (B) may be employed in such an amount that the molar ratio of the total alkali metal to the phosphorus compound becomes 1 to 5, preferably 2 to 4. At the molar ratio being smaller than 1, the gelation of the polyamide is accelerated, though the viscosity is increased. At the molar ratio being larger than 5, the viscosity becomes insufficient and, particularly under the condition of reduced pressure, gelation is accelerated. Besides, the use of such a large amount of the compound is not favorable from economical viewpoint.

As mentioned above, an excellent inhibiting effect of gel-formation can be obtained by the combined use of the phosphorus compound and the alkali metal compound. Such effect can be potentiated by the additional incorporation of the dicarboxylic acid cyclic anhydride or its hydrolyzed product (C) and/or o-phenylenediamine or its derivative (D) in certain amounts. The potentiation effect brought by the component (C) is probably due to the selective reaction of the same with terminal amino groups to block them, while that brought by the component (D) may be due to the blocking of carboxyl groups, reactive to the said secondary amine, with the same. Still, it may be noted that the incorporation of the component (D) is also effective in improving the dyeing property of the polyamide.

As the dicarboxylic acid cyclic anhydride and its hydrolyzed product (C), there may be exemplified phthalic anhydride, phthalic acid, tetrahydrophthalic anhydride, 4-hydroxyphthalic anhydride, 3-nitrophthalic acid, 1,2-cyclohexanedicarboxylic acid anhydride, maleic anhydride, methylmaleic anhydride, 4-methyltetrahydro-o-phthalic acid, 4-chloromethyltetrahydro-o-phthalic acid, 3-methyltetrahydro-o-phthalic anhydride, a compound of the formula:

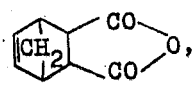

etc. Of these, phthalic anhydride is employed the most preferably.

Examples of o-phenylenediamine and its derivative (D) are N-methyl-o-phenylenediamine, 3-methyl-o-phenylenediamine, 4-methyl-o-phenylenediamine, N,-N'-dimethyl-o-phenylenediamine, N-phenyl-o-phenylenediamine, etc. There may be also employed other compounds which are decomposed at a high temperature to form the said o-phenylene compounds.

The amounts of the components (C) and (D) to be used in the polyamide composition of the invention may be each from 0.01 to 2 % by weight, preferably from 0.1 to 1 % by weight, based on the weight of the polyamide. When the amount is smaller than 0.01 % by weight, the inhibiting effect of gel-formation is not satisfactory. When it exceeds 2 % by weight, the workability in spinning is lowered, and the increase of the inhibiting effect of gel-formation is not expected any more.

The polyamide composition of the invention may contain any other additives such as frosting agents, viscosity stabilizers, light resisting agents and heat resisting agents.

The incorporation of the essential and optional additives as mentioned above may be executed before or during the polymerization for production of the polyamide. Alternatively, they may be admixed with the obtained polymer in a molten state or in a solution form. They may be added all at once or separately at different stages.

The molecular weight of the obtained polymer is hardly influenced by the addition or the addition time of these additives.

The polymerization for production of the polyamide may be carried out in a per se conventional manner using any appropriate polymerization apparatus such as a continuous pressure polymerization apparatus, a continuous atmospheric pressure polymerization apparatus or an autoclave polymerization apparatus.

Practical and presently preferred embodiments of the present invention are illustratively shown in the following Examples. In these Examples, the solution viscosity means the relative viscosity which is represented by the ratio of the value of the viscosity of a solution of the polymer (1g) in 96 % sulfuric acid (100 ml) determined at 25°C by the use of Ostwald's viscometer to the value of the viscosity of 96 % sulfuric acid alone determined in the same manner. The gelation times means the time (hrs.) which is required for making the polymer insoluble in 98 to 100 % formic acid when it is heated at a certain temperature under steam stream of a certain pressure. The insolubilization of the polymer in formic acid is confirmed in the following manner: the polymer is crushed into powders of 10 to 20 mesh; the powder (0.1 g) is charged in a flask, and 98 to 100 % formic acid (20 ml) is added thereto; the flask is allowed to stand for 4 hours, and the state of the polymer is observed. When the polymer does not contain any gel, it is completely dissolved in the solvent in 4 hours. On the other hand, when the polymer contains any gel, the particles are only dampened and expanded with the solvent, and a uniform formic acid solution is not obtained after 4 hours. By the presence of this dampened and expanded polymer, the gelation of the polymer is confirmed.

EXAMPLE 1

The salt of metaxylylenediamine with adipic acid (500 g), distilled water (1,000 g) and additives as shown in Table 1 are charged in an autoclave, and the atmosphere is replaced by nitrogen. The temperature is elevated while distilling out water so as to keep the inner pressure to 10 kg/cm$^2$. When the inner temperature becomes 260°C, the inner pressure is gradually reduced to atmospheric pressure over 90 minutes, and the reaction is continued for further 1 hour at the same temperature and the same pressure. The produced polymer is extruded out under nitrogen pressure given from the outside of the reaction system, passed through a cooling bath and cut into pieces with a chip cutter. The solution viscosity and the gelation time at 270°C under steam stream of atmospheric pressure of the thus obtained polymer are measured. The results are shown in Table 1.

Table 1

| No. | phosphorus compound | Additives Amount* | Alkali metal compound | Amount** | Solution viscosity | Gelation time (hrs.) |
|---|---|---|---|---|---|---|
| 1 | Not added | — | Not added | — | 2.23 | 18 |
| 2 | Phenylphosphonous acid Sodium | 200 | Not added | — | 2.25 | 16 |
| 3 | phenylphosphonite Sodium | 200 | Not added | 1 | 2.25 | 24 |
| 4 | phenylphosphonite Sodium | 200 | Sodium hydroxide | 2 | 2.23 | 33 |
| 5 | phenylphosphonite Sodium | 200 | Sodium hydroxide | 4 | 2.20 | 38 |
| 6 | phenylphosphonite Sodium | 500 | sodium hydroxide | 2 | 2.25 | 40 |
| 7 | Ethyl phenylphosphonite Sodium | 200 | Sodium hydroxide | 2 | 2.22 | 33 |
| 8 | hypophosphite Sodium | 200 | Not added | 1 | 2.23 | 20 |
| 9 | hypophosphite Sodium | 200 | Sodium methoxide | 2 | 2.27 | 35 |
| 10 | hypophosphite Potassium | 200 | Sodium methoxide Potassium | 3 | 2.23 | 41 |

Table 1—Continued

| No. | phosphorus compound | Additives Amount* | Alkali metal compound | Amount** | Solution viscosity | Gelation time (hrs.) |
|---|---|---|---|---|---|---|
| 11 | hypophosphite | 200 | methoxide Sodium | 5 | 2.17 | 45 |
| 12 | Diethylphosphinic acid | 200 | hydroxide | 2 | 2.23 | 34 |

Note:
*ppm by weight as phosphorus to the polyamide.
**the molar ratio of the total alkali metal to the phosphorus compound.

From the table, it is understood that excellent results can be obtained by the addition of the phosphorous compound and the alkali metal compound.

EXAMPLE 2

The salt of hexamethylenediamine with adipic acid (500 g), distilled water (500 g) and additives as shown in Table 2 are treated in the same manner as in Example 1 to execute the polymerization except that the inner temperature is elevated up to 275°C. The solution viscosity and the gelation time at 290°C under steam stream of atmospheric pressure of the obtained polymer are measured. The results are shown in Table 2.

Table 2

| No. | Phosphorus compound | Additives Amount | Alkali metal compound | Amount | Solution viscosity | Gelation time (hrs.) |
|---|---|---|---|---|---|---|
| 1 | Not added | — | Not added | — | 2.70 | 27 |
| 2 | Sodium hypophosphite | 200 | Not added | 1 | 2.72 | 30 |
| 3 | Sodium hypophosphite | 200 | Sodium hydroxide | 3 | 2.72 | 50 |

Note: The denomination of the amount is as defined in Example 1.

From the table, it is understood that a remarkable synergistic effect on the prolongation of the gelation time can be obtained by the addition of the phosphorus compound and the alkali metal compound.

EXAMPLE 3

The production of polymetaxylylene adipamide is executed in the same manner as in Example 1 but using a nylon salt containing 1.0 mol % excess of adipic acid as the viscosity stabilizer without the addition of the gelation inhibitor. The produced polymer in a molten state is admixed with additives as shown in Table 3, cooled and crushed. The solution viscosity and the gelation time of the obtained polymer are measured. The results are shown in Table 3.

Table 3

| No. | Phosphorus compound | Additives Amount | Alkali metal compound | Amount | Solution viscosity | Gelation time (hrs.) |
|---|---|---|---|---|---|---|
| 1 | Not added | — | Not added | — | 2.00 | 25 |
| 2 | Sodium phenylphosphonite | 200 | Not added | 1 | 2.02 | 27 |
| 3 | Sodium phenylphosphonite | 200 | Sodium ethoxide | 2 | 2.00 | 44 |
| 4 | Sodium phenylphosphonite | 200 | Sodium ethoxide | 10 | 1.33 | 50 |
| 5 | Not added | — | Sodium hydroxide | 1.29*×10⁻⁵ (mol/g) | 1.92 | 28 |
| 6 | Not added | — | Sodium acetate | 1.29*×10⁻⁵ (mol/g) | 1.86 | 30 |

Note: *the amount corresponding to the molar ratio, Na/P=2, provided that 200 ppm by weight of phosphorus are added. The denomination of the amount is as defined in Example 1.

From the table, it is obvious that, by adding the gelation inhibitor after the polymerization, almost the same results are obtained as in the case that the gelation inhibitor is added before the polymerization (EXAMPLE 1). It is also seen that the addition of sodium acetate can decrease the solution viscosity of the polymer and thereby prolong the gelation time to some extent, but the effect is inferior to that of the combination of the phosphorus compound and the alkali metal compound.

EXAMPLE 4

The salt of metaxylylenediamine with adipic acid (500 g), distilled water (1,000 g) and additives as shown in Table 4 are treated in the same manner as in Example 1 to execute the polymerization. The solution viscosity and the gelation time at 270°C under steam stream of atmospheric pressure of the obtained polymer are measured. The results are shown in Table 4.

Table 4

| No. | Phosphorus compound | Additives Amount | Alkali metal compound | Amount | Solution viscosity | Gelation time (hrs.) |
|---|---|---|---|---|---|---|
| 1 | Not added | — | Not added | — | 2.24 | 17 |
| 2 | Phenylphosphonic acid | 200 | Not added | — | 2.26 | 16 |
| 3 | Sodium phenylphosphonate | 200 | Not added | 1 | 2.25 | 21 |
| 4 | Sodium phenylphosphonate | 200 | Sodium hydroxide | 3 | 2.24 | 34 |

Table 4 — Continued

| No. | Phosphorus compound | Additives Amount | Alkali metal compound | Amount | Solution viscosity | Gelation time (hrs.) |
|---|---|---|---|---|---|---|
| 5 | Sodium phenylphosphonate | 200 | Sodium hydroxide | 5 | 2.19 | 38 |
| 6 | Sodium phenylphosphonate | 200 | Sodium hydroxide | 10 | 1.30 | 32 |
| 7 | Sodium phenylphosphonate | 30 | Sodium hydroxide | 3 | 2.23 | 20 |
| 8 | Sodium phenylphosphonate | 500 | Sodium hydroxide | 3 | 2.18 | 42 |
| 9 | Sodium phenylphosphonate | 1000 | Sodium hydroxide | 3 | 2.08 | 45 |
| 10 | Monosodium hydrogenphosphite | 200 | Sodium hydroxide | 3 | 2.23 | 34 |
| 11 | Monosodium hydrogenphosphite | 200 | Sodium hydroxide | 5 | 2.19 | 40 |

Note: The denomination of the amount is as defined in Example 1.

From the results, it is understood that a remarkable effect can be obtained by the addition of the phosphorus compound and the alkali metal compound.

EXAMPLE 5

The salt of hexamethylenediamine with adipic acid (500 g), distilled water (500 g) and additives as shown in Table 5 are treated in the same manner as in Example 1 to execute the polymerization except that the inner temperature is elevated up to 275°C. The solution viscosity and the gelation time at 290°C under steam stream of atmospheric pressure of the obtained polymer are measured. The results are shown in Table 5.

Table 5

| No. | Phosphorus compound | Additives Amount | Alkali metal compound | Amount | Solution viscosity | Gelation time (hrs.) |
|---|---|---|---|---|---|---|
| 1 | Not added | — | Not added | — | 2.70 | 27 |
| 2 | Monosodium hydrogenphosphite | 200 | Not added | 2 | 2.70 | 29 |
| 3 | Monosodium hydrogenphosphite | 200 | Sodium hydroxide | 3 | 2.68 | 48 |
| 4 | Not added | — | Sodium hydroxide | 1.29* ×10⁻⁵ (mol/g) | 2.55 | 31 |

Note: *the amount corresponding to the molar ratio, Na/P=2, provided that 200 ppm by weight of phosphorus are added.

The denomination of the amount is as defined in Example 1.

In general, the gelation time of the polymer becomes shorter with the increase of the molecular weight or the solution viscosity under the same thermal degradation condition. The results of this Example show that the remarkable synergistic effect on the prolongation of the gelation time can be obtained by the combined use of the phosphorus compound and the alkali metal compound.

EXAMPLE 6

A mixture of the salt of metaxylylenediamine with adipic acid and distilled water is treated as in Example 1 in the absence of additives to produce polymetaxylylene adipamide. The obtained polymer is molten and kneaded with additives as shown in Table 6, and the product is cooled and crushed. The solution viscosity and the gelation time at 270°C under steam stream of atmospheric pressure of the resultant polymer are measured. The results are shown in Table 6.

Table 6

| No. | Phosphorus compound | Additives Amount | Alkali metal compound | Amount | Solution viscosity | Gelation time (hrs.) |
|---|---|---|---|---|---|---|
| 1 | Not added | — | Not added | — | 2.24 | 17 |
| 2 | Sodium phenylphosphonate | 200 | Not added | 1 | 2.25 | 20 |
| 3 | Sodium phenylphosphonate | 200 | Sodium ethoxide | 3 | 2.23 | 36 |
| 4 | Not added | — | Sodium acetate | 1.29* ×10⁻⁵ (mol/g) | 2.02 | 22 |

Note: *the amount corresponding to the molar ratio, Na/P=2, provided that 200 ppm by weight of phosphorus are added.

The denomination of the amount is as defined in Example 1.

Comparing the results with those of Example 4, it is understood that, by the addition of the gelation inhibitor after polymerization, almost the same effect is obtained as in the case that the gelation inhibitor is added before polymerization. The addition of sodium acetate can decrease the solution viscosity of the polymer and thereby prolong the gelation time to some extent, but the effect is inferior to that of the combination of the phosphorus compound and the alkali metal compound.

EXAMPLE 7

The production of polymetaxylylene adipamide is executed as in Example 1 using as the gelation inhibitor sodium phenylphosphonite in the amount of 200 ppm by weight to the polyamide as phosphorus and sodium hydroxide in such an amount that the molar ratio of the total alkali metal to phosphorus becomes 2. For comparison, the polymerization in the absence of the gelation inhibitor is also executed. Both the obtained polymers show a solution viscosity of 2.25.

The polymer is subjected to melt spinning under the following conditions: spinning temperature, 260°C; diameter of nozzle, 0.3 mm; number of nozzle holes, 20; through-put, 12.3 g/min; take-up velocity rate, 910 m/min. The product is then stretched at the drawing ratio of 3.1 under the rate of 640 m/min. to obtain bright yarn of 40 d/20 f. In the spinning of the polymer containing no gelation inhibitor, snapping of yarn at the nozzle part is frequently caused after continuous spinning for about 2 days and the back pressure of nozzle is rapidly elevated to make the spinning impossible. On the other hand, the polymer containing the gelation inhibitor is smoothly spun and stretched, and after continuous spinning for about 1 week, snapping of yarn at the nozzle part is hardly caused and elevation of the back pressure of nozzle is not observed. The number of knobs per one million meter of the stretched yarn is determined by the slit method. The results are shown in Table 7.

| Spinning time (hrs.) | Number of knobs per one million meter of stretched yarn | |
|---|---|---|
| | Gelation inhibitor | |
| | Added | Not added |
| 12 | 4 | 3 |
| 24 | 3 | 12 |
| 36 | 7 | 178 |
| 48 | 4 | - |
| 72 | 8 | - |

| Spinning time (hrs.) | Gelation inhibitor | |
|---|---|---|
| | Added | Not added |
| 96 | 10 | - |
| 144 | 7 | - |

EXAMPLE 8

The salt of metaxylylenediamine with adipic acid (500 g), distilled water (1,000 g) and additives as shown in Table 8 are treated in the same manner as in Example 1 to execute the polymerization. The product is extruded out under nitrogen pressure given from the outside of the reaction system, passed through a cooling bath and cut into pieces with a chip cutter. The viscosity in solution and the gelation time at 270°C under steam stream of atmospheric pressure of the thus obtained polymer are measured. The results are shown in Table 8.

From the results, it is seen that a remarkable gelation inhibiting effect can be obtained in the polymers containing the phosphorus compound, the alkali metal compound and the component (C), comparing with other polymers showing the same solution viscosity.

Table 8

| No. | Component (C) | Amount* | Additives Phosphorus compound | Amount** | Alkali metal compound | Amount** | Polymerization condition | Solution viscosity | Gelation time (hrs.) |
|---|---|---|---|---|---|---|---|---|---|
| 1 | Not added | — | Not added | — | Not added | — | Atmospheric pressure | 2.23 | 18 |
| 2 | Not added | — | Phenylphosphonous acid | 200 | Not added | — | Atmospheric pressure | 2.25 | 16 |
| 3 | Not added | — | Phenylphosphonous acid | 200 | Sodium hydroxide | 2 | Atmospheric pressure | 2.23 | 38 |
| 4 | Not added | — | Sodium hypophosphite | 200 | Sodium hydroxide | 3 | Atmospheric pressure | 2.24 | 37 |
| 5 | Not added | — | Phenylphosphonic acid | 200 | Sodium hydroxide | 2 | Atmospheric pressure | 2.23 | 38 |
| 6 | Not added | — | Phosphorous acid | 200 | Lithium hydroxide | 3 | Atmospheric pressure | 2.23 | 38 |
| 7 | Phthalic anhydride | 0.45 | Not added | — | Not added | — | Reduced pressure | 2.23 | 40 |
| 8 | Caproic acid | 0.40 | Not added | — | Not added | — | Reduced pressure | 2.23 | 20 |
| 9 | Adipic acid | 0.28 | Not added | — | Not added | — | Reduced pressure | 2.23 | 11 |
| 10 | Tetrahydrophthalic anhydride | 0.52 | Not added | — | Not added | — | Reduced pressure | 2.24 | 37 |
| 11 | 1,2-Cyclohexanedicarboxylic acid anhydride | 0.38 | Not added | — | Not added | — | Reduced pressure | 2.23 | 37 |
| 12 | Phthalic anhydride | 0.45 | Phenylphosphonous acid | 200 | Sodium hydroxide | 2 | Reduced pressure | 2.23 | 90 |
| 13 | Caproic acid | 0.40 | Phenylphosphonous acid | 200 | Sodium hydroxide | 2 | Reduced pressure | 2.22 | 43 |
| 14 | Adipic acid | 0.28 | Phenylphosphonous acid | 200 | Sodium hydroxide | 2 | Reduced pressure | 2.22 | 25 |
| 15 | Tetrahydrophthalic anhydride | 0.52 | Phenylphosphonous acid | 200 | Sodium hydroxide | 2 | Reduced pressure | 2.23 | 84 |
| 16 | Phthalic acid | 0.51 | Phenylphosphonous acid | 200 | Sodium methoxide | 2 | Reduced pressure | 2.23 | 92 |
| 17 | Maleic anhydride | 0.30 | Phenylphosphonous acid | 200 | Sodium methoxide | 2 | Reduced pressure | 2.24 | 80 |
| 18 | Phthalic acid | 0.51 | Phenylphosphonic acid | 200 | Lithium hydroxide | 2 | Reduced pressure | 2.23 | 90 |
| 19 | Phthalic acid | 0.51 | Sodium hydrogenphonic acid | 200 | Sodium hydroxide | 2 | Reduced pressure | 2.23 | 90 |
| 20 | Phthalic acid | 0.51 | Phosphorous acid | 200 | Sodium hydroxide | 8 | Reduced pressure | 1.53 | 44 |
| 21 | Phthalic acid | 0.51 | Phosphorous acid | 500 | Sodium hydroxide | 2 | Reduced pressure | 2.18 | 98 |
| 22 | Phthalic acid | 2.00 | Phosphorous acid | 200 | Sodium hydroxide | 2 | Reduced pressure | 1.45 | 130 |
| 23 | Phthalic acid | 0.51 | Sodium dimethylphosphinate | 200 | Sodium hydroxide | 2 | Reduced pressure | 2.19 | 110 |

Note:
*percents by weight to the polyamide;
**the denomination of the amount is as defined in Example 1.

In Experiments Nos. 7 to 23, the polymerization is carried out under reduced pressure by reducing the pressure from atmospheric pressure to 100 mmHg over 30 minutes and keeping the pressure for 30 minutes at the same temperature, and the determination of the gelation time is executed under steam stream of 100 mmHg.

EXAMPLE 9

The salt of hexamethylenediamine with adipic acid (500 g), distilled water (500 g) and additives as shown in Table 9 are treated in the same manner as in Example 1 to execute the polymerization except that the temperature is elevated up to 275°C. The viscosity in solution and the gelation time at 290°C under steam stream of atmospheric pressure of the thus obtained polymer are measured. The results are shown in Table 9.

In Experiments Nos. 4 to 11, the polymerization is carried out under reduced pressure as in Example 8, and the determination of the gelation time is executed under steam stream of 100 mmHg.

EXAMPLE 10

The salt of metaxylylenediamine with adipic acid (500 g), distilled water (1,000 g) and additives as shown in Table 10 are treated in the same manner as in Example 1 to execute the polymerization. The solution viscosity and the gelation time at 270°C under steam atream of atmospheric pressure of the thus obtained polymer are measured. The results are shown in Table 10.

From the results, it is seen that a remarkable gelation inhibiting effect can be obtained in the polymers containing a phosphorus compound, an alkali metal compound and o-phenylenediamine, comparing with other polymers showing the same solution viscosity.

Table 9

| No. | Component (C) | Amount | Additives Phosphorus compound | Amount | Alkali metal compound | Amount | Polymerization condition | Solution viscosity | Gelation time (hrs.) |
|---|---|---|---|---|---|---|---|---|---|
| 1 | Not added | — | Not added | — | Not added | — | Atmospheric pressure | 2.70 | 27 |
| 2 | Not added | — | Hypophosphorous acid | 200 | Lithium hydroxide | 3 | Atmospheric pressure | 2.72 | 50 |
| 3 | Not added | — | Phosphorous acid | 200 | Lithium hydroxide | 3 | Atmospheric pressure | 2.72 | 49 |
| 4 | Phthalic anhydride | 0.45 | Not added | — | Not added | — | Reduced pressure | 2.70 | 48 |
| 5 | 1,2-cyclohexane-dicarboxylic acid anhydride | 0.38 | Not added | — | Not added | — | Reduced pressure | 2.70 | 45 |
| 6 | 1,2-Cyclohexane-dicarboxylic acid anhydride | 0.38 | Phenylphosphonous acid | 200 | Potassium hydroxide | 2 | Reduced pressure | 2.71 | 120 |
| 7 | 1,2-Cyclohexane-dicarboxylic acid anhydride | 0.38 | Phencylphosphonic acid | 200 | Potassium hydroxide | 2 | Reduced pressure | 2.72 | 120 |
| 8 | Phthalic acid | 0.51 | Sodium hypophosphite | 200 | Sodium hydroxide | 2 | Reduced pressure | 2.72 | 124 |
| 9 | Phthalic acid | 0.51 | Potassium hydrogenphosphite | 200 | Potassium methoxide | 2 | Reduced pressure | 2.72 | 125 |
| 10 | Phthalic anhydride | 0.45 | Phosphorous acid | 200 | Not added | — | Reduced pressure | 2.88 | 37 |
| 11 | Phthalic anhydride | 0.45 | Phenylphosphonous acid | 50 | Sodium hydroxide | 2 | Reduced pressure | 2.70 | 53 |

Note: the denomination of the amount is as defined in Example 8.

Table 10

| No. | o-Pheneylenediamine compound | Amount | Additives Phosphorus compound | Amount** | Alkali metal compound | Amount** | Polymerization condition | Solution viscosity | Gelation time (hrs.) |
|---|---|---|---|---|---|---|---|---|---|
| 1 | Not added | — | Not added | — | Not added | — | Atmospheric pressure | 2.23 | 18 |
| 2 | Not added | — | Phenylphosphonous acid | 200 | Not added | — | Atmospheric pressure | 2.25 | 16 |
| 3 | Not added | — | Phenylphosphonous acid | 200 | Sodium hydroxide | 2 | Atmospheric pressure | 2.23 | 38 |
| 4 | Not added | — | Sodium hypophosphite | 200 | Sodium hydroxide | 3 | Atmospheric pressure | 2.24 | 37 |
| 5 | Not added | — | Phenylphosphonic acid | 200 | Sodium hydroxide | 2 | Atmospheric pressure | 2.23 | 38 |
| 6 | Not added | — | Phosphorous acid | 200 | Sodium hydroxide | 3 | Atmospheric pressure | 2.23 | 38 |
| 7 | o-Phenylenediamine | 0.45 | Not added | — | Not added | — | Reduced pressure | 2.24 | 37 |

Table 10—Continued

| No. | o-Phenylene-diamine compound | Amount | Additives Phosphorus compound | Amount** | Alkali metal compound | Amount** | Polymerization condition | Solution viscosity | Gelation time (hrs.) |
|---|---|---|---|---|---|---|---|---|---|
| 8 | m-Xylyylene-diamine | 0.39 | Not added | — | Not added | — | Reduced pressure | 2.23 | 15 |
|   | 2-Ethylhexyl-amine | 0.32 | Not added | — | Not added | Reduced | 2.23 | 23 |  |
|   | o-Phenylene-diamine | 0.45 | Phenylphosphonous acid | 200 | Sodium hydroxide | 2 | Reduced pressure | 2.23 | 82 |
| 11 | 3-Methyl-o-phenylenediamine | 0.51 | Phenylphosphonous acid | 200 | Sodium hydroxide | 2 | Reduced pressure | 2.25 | 85 |
| 12 | 2-Ethylhexyl-amine | 0.32 | Phenylphosphonous acid | 200 | Sodium hydroxide | 2 | Reduced pressure | 2.22 | 43 |
| 13 | o-Phenylene-diamine | 0.45 | Phenylphosphonic acid | 200 | Lithium hydroxide | 2 | Reduced pressure | 2.24 | 79 |
| 14 | o-Phenylene-diamine | 0.45 | Hypophosphorous acid | 200 | Sodium methoxide | 3 | Reduced pressure | 2.23 | 88 |
| 15 | o-phenylene-diamine | 0.45 | Phosphorous acid | 200 | Sodium methoxide | 3 | Reduced pressure | 2.23 | 85 |
| 16 | o-Phenylene-diamine | 2.00 | Sodium hypophosphite | 200 | Sodium hydroxide | 3 | Reduced pressure | 1.41 | 123 |
| 17 | o-Phenylene-diamine | 0.45 | Sodium hypophosphine | 200 | Sodium hydroxide | 8 | Reduced pressure | 1.55 | 50 |
| 18 | o-Phenylene-diamine | 0.45 | Sodium hypophosphite | 500 | Sodium hydroxide | 2 | Reduced pressure | 2.16 | 100 |
| 19 | o-Phenylene-diamine | 0.45 | Sodium hypophosphite | 30 | Sodium hydroxide | 2 | Reduced pressure | 2.23 | 40 |
| 20 | o-Phenylene-diamine | 0.45 | Sodium hypophosphite | 200 | Not added | — | Reduced pressure | 2.27 | 35 |
| 21 | o-Phenylene-diamine | 0.45 | Phenylphosphinic acid | 200 | Sodium hydroxide | 2 | Reduced pressure | 2.22 | 105 |

Note: The denomination of the amount is as defined in Example 8.

In Experiments Nos. 7 to 21, the polymerization is carried out under reduced pressure as in Example 8, and the determination of the gelation time is executed under steam stream of 100 mmHg.

EXAMPLE 11

The salt of hexamethylenediamine with adipic acid (500 g), o-phenylenediamine (1.94 g), sodium hypophosphite monohydrate (0.30 g), sodium hydroxide (0.22 g) and distilled water (500 g) are charged in an autoclave, and the polymerization is carried out at 275°C under reduced pressure. For comparison, the polymerization under atmospheric pressure is also executed in the absence of the gelation inhibitor. The thus obtained polymers show respectively a gelation time of 68 hours and of 27 hours at 270°C, and their solution viscosities are 2.68 and 2.70, respectively.

The polymer is then subjected to melt spinning, and the obtained yarn is dyed with an acid dye "Suminol level rubinol 3GP" (manufactured by Sumitomo Chemical Company, Limited). The K/S value of the yarn of the polymer of the invention is 5.8 and that of the control polymer is 3.2. Thus, the yarn of the polymer of the invention is dyed much more deeply and clearly.

EXAMPLE 12

The production of polymetaxylylene adipamide is executed in the same manner as in Example 1 using as the gelation inhibitor phthalic anhydride in the amount of 0.45 % by weight to the polyamide, phenyl phosphonous acid in the amount of 200 ppm by weight to the polyamide as phosphorus and sodium hydroxide in such an amount that the molar ratio of the total alkali metal to phosphorus becomes 2. For comparison, the polymerization in the absence of the gelation inhibitor is also executed. Both the obtained polymers show a solution viscosity of 2.23.

The polymer is subjected to melt spinning under the following conditions: spinning temperature, 260°C; diameter of nozzle, 0.3 mm; number of nozzle holes, 20; through-put rate, 12.3 g/min.; take-up velocity, 910 m/mm.. The product is then stretched at the drawing ratio of 3.1 under the rate of 640 m/min. to obtain bright yarn of 40 d/20 f. In the spinning of the polymer containing no gelation inhibitor, snapping of yarn at the nozzle part is frequently caused after continuous spinning for about 2 days and the back pressure of nozzle is rapidly elevated to require the exchange of nozzle and the cleaning of the inside of the spinning apparatus. On the other hand, the polymer containing the gelation inhibitor is smoothly spun and stretched, and after continuous spinning for about 10 days, snapping of yarn at the nozzle part is hardly caused and elevation of the back pressure of nozzle is not observed. The number of knobs per one million meter of the stretched yarn of the polymer containing the gelation inhibitor is much smaller than that of the yarn of the control polymer, when determined by the slit method.

What is claimed is:

1. A polyamide composition which comprises a polyamide; at least one phosphorus component (A) selected from the group consisting of (1) a phosphinic acid compound of the formula

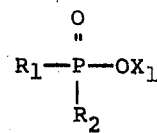

in which each of $R_1$ and $R_2$ is hydrogen, alkyl, aryl or cycloalkyl, and $X_1$ is hydrogen, alkyl, aryl, cycloalkyl or an alkali metal, or $X_1$ may be linked to either $R_1$ or $R_2$ to form a ring, (2) a phosphonous acid compound of the formula

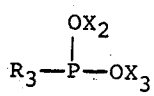

in which $R_3$ is hydrogen, alkyl, aryl or cycloalkyl, and each of $X_2$ and $X_3$ is hydrogen, alkyl, aryl, cycloalkyl or an alkali metal, or one of $X_2$ or $X_3$ may be linked to $R_3$ to form a ring (3) a phosphinic acid compound of the formula

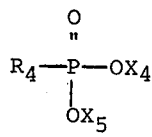

in which $R_4$ is hydrogen, alkyl, aryl or cycloalkyl, and each of $X_4$ and $X_5$ is hydrogen, alkyl, aryl, cycloalkyl or an alkali metal, or one of $X_4$ and $X_5$ may be lined to $R_4$ to form a ring, and (4) a phosphorous acid compound of the formula

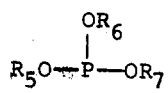

in which each of $R_5$, $R_6$ and $R_7$ is hydrogen, alkyl, aryl or cycloalkyl; and at least one alkali metal component (B) of the formula $$Z—OR_8$$

in which Z is an alkali metal, and $R_8$ is hydrogen, alkyl, aryl, cycloalkyl or a group of the formula

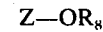

wherein Z' is hydrogen or an alkali metal; the amount of component (A) being from 50 to 1,000 ppm, in terms of phosphorus, based on the weight of the polyamide; and the amount of component (B) being from 1 to 5 moles, in terms of alkali metal, per mole of component (A).

2. The polyamide composition according to claim 1, which additionally comprises at least one dicarboxylic acid anhydride component (C) of the formula

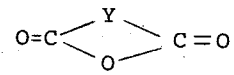

or its hydrolyzed product, in which Y is a group of the formula

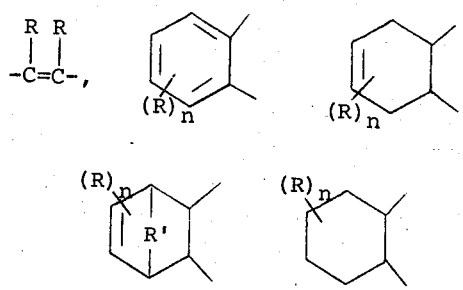

wherein each R is the same or different and is selected from the group consisting of hydrogen alkyl, aryl, cycloalkyl, halogen, nitro and hydroxyl, R' is alkylene, and n is an integer from 1 to 4; the amount of component (C) being from 0.01 to 2% by weight based on the weight of the polyamide.

3. The polyamide composition according to claim 1 wherein the amount of the component (A) is 100 to 500 ppm in terms of phosphorus based on the weight of the polyamide and the amount of the component (B) is 2 to 4 mole in terms of alkali metal per 1 mole of the component (A).

4. The polyamide composition according to claim 2, wherein the amount of the component (C) is 0.1 to 1 % by weight based on the weight of the polyamide.

5. The polyamide composition according to claim 1, which comprises additionally (D) at least one o-phenylenediamine and/or its derivatives, the amount of the component (D) being 0.01 to 2 % by weight based on the weight of the polyamide.

6. The polyamide composition accordint to claim 5, wherein the amount of the component (D) is 0.1 to 1 % by weight based on the weight of the polyamide.

* * * * *

UNITED STATES PATENT OFFICE
CERTIFICATE OF CORRECTION

Patent No. 3,872,055　　　　　　　　　Dated March 18, 1975

Inventor(s) Kaoru Furukawa et al.

It is certified that error appears in the above-identified patent and that said Letters Patent are hereby corrected as shown below:

In the ABSTRACT, second line from the bottom, "$x_1$" should read -- $X_1$ --.

In Columns 6 and 7, Table 1 should read:

Table 1

| No. | Additives | | | | Solution viscosity | Gelation time (hrs.) |
| --- | --- | --- | --- | --- | --- | --- |
| | Phosphorus compound | Amount*) | Alkali metal compound | Amount**) | | |
| 1 | Not added | – | Not added | – | 2.23 | 18 |
| 2 | Phenylphosphonous acid | 200 | Not added | – | 2.25 | 16 |
| 3 | Sodium phenylphosphonite | 200 | Not added | 1 | 2.25 | 24 |
| 4 | Sodium phenylphosphonite | 200 | Sodium hydroxide | 2 | 2.23 | 33 |
| 5 | Sodium phenylphosphonite | 200 | Sodium hydroxide | 4 | 2.20 | 38 |
| 6 | Sodium phenylphosphonite | 500 | Sodium hydroxide | 2 | 2.25 | 40 |
| 7 | Ethyl phenylphosphonite | 200 | Sodium hydroxide | 2 | 2.22 | 33 |
| 8 | Sodium hypophosphite | 200 | Not added | 1 | 2.23 | 20 |
| 9 | Sodium hypophosphite | 200 | Sodium methoxide | 2 | 2.27 | 35 |
| 10 | Sodium hypophosphite | 200 | Sodium methoxide | 3 | 2.23 | 41 |
| 11 | Potassium hypophosphite | 200 | Potassium methoxide | 5 | 2.17 | 45 |
| 12 | Diethylphosphinic acid | 200 | Sodium hydroxide | 2 | 2.23 | 34 |

Note: *) ppm by weight as phosphorus to the polyamide.

**) the molar ratio of the total alkali metal to the phosphorus compound.

UNITED STATES PATENT OFFICE
CERTIFICATE OF CORRECTION  Page 2

Patent No. 3,872,055              Dated March 18, 1975

Inventor(s) Kaoru Furukawa et al.

It is certified that error appears in the above-identified patent and that said Letters Patent are hereby corrected as shown below:

In columns 11 and 12, Table 7 should read:

Table 7

| Spinning time (hrs.) | Number of knobs per one million meter of stretched yarn ||
|---|---|---|
| | Gelation inhibitor ||
| | Added | Not added |
| 12 | 4 | 3 |
| 24 | 3 | 12 |
| 36 | 7 | 178 |
| 48 | 4 | - |
| 72 | 8 | - |
| 96 | 10 | - |
| 144 | 7 | - |

In columns 11 and 12, Table 8 should read as shown on the attached sheets.

Patent No. 3,872,055

Table 8

| No. | Component (G) | Amount*) | Additives Phosphorus compound | Amount**) | Alkali metal compound | Amount**) | Polymerization condition | Solution viscosity | Gelation time (hrs.) |
|---|---|---|---|---|---|---|---|---|---|
| 1 | Not added | - | Not added | - | Not added | - | Atmospheric pressure | 2.23 | 18 |
| 2 | Not added | - | Phenylphosphonous acid | 200 | Not added | - | Atmospheric pressure | 2.25 | 16 |
| 3 | Not added | - | Phenylphosphonous acid | 200 | Sodium hydroxide | 2 | Atmospheric pressure | 2.23 | 38 |
| 4 | Not added | - | Sodium hypophosphite | 200 | Sodium hydroxide | 3 | Atmospheric pressure | 2.24 | 37 |
| 5 | Not added | - | Phenylphosphonic acid | 200 | Sodium hydroxide | 2 | Atmospheric pressure | 2.23 | 38 |
| 6 | Not added | - | Phosphorous acid | 200 | Lithium hydroxide | 3 | Atmospheric pressure | 2.23 | 38 |
| 7 | Phthalic anhydride | 0.45 | Not added | - | Not added | - | Reduced pressure | 2.23 | 40 |
| 8 | Caproic acid | 0.40 | Not added | - | Not added | - | Reduced pressure | 2.23 | 20 |
| 9 | Adipic acid | 0.28 | Not added | - | Not added | - | Reduced pressure | 2.23 | 11 |
| 10 | Tetrahydrophthalic anhydride | 0.52 | Not added | - | Not added | - | Reduced pressure | 2.24 | 37 |

| | | | | | | |
|---|---|---|---|---|---|---|
| 11 | 1,2-Cyclohexane-dicarboxylic acid anhydride | 0.38 | Not added | — | Not added | — | Reduced pressure | 2.23 | 37 |
| 12 | Phthalic anhydride | 0.45 | Phenylphosphonous acid | 200 | Sodium hydroxide | 2 | Reduced pressure | 2.23 | 90 |
| 13 | Caproic acid | 0.40 | Phenylphosphonous acid | 200 | Sodium hydroxide | 2 | Reduced pressure | 2.22 | 43 |
| 14 | Adipic acid | 0.28 | Phenylphosphonous acid | 200 | Sodium hydroxide | 2 | Reduced pressure | 2.22 | 25 |
| 15 | Tetrahydrophthalic anhydride | 0.52 | Phenylphosphonous acid | 200 | Sodium hydroxide | 2 | Reduced pressure | 2.23 | 84 |
| 16 | Phthalic acid | 0.51 | Phenylphosphonous acid | 200 | Sodium methoxide | 2 | Reduced pressure | 2.23 | 92 |
| 17 | Maleic anhydride | 0.30 | Phenylphosphonous acid | 200 | Sodium methoxide | 2 | Reduced pressure | 2.24 | 80 |
| 18 | Phthalic acid | 0.51 | Phenylphosphonic acid | 200 | Lithium hydroxide | 2 | Reduced pressure | 2.23 | 90 |
| 19 | Phthalic acid | 0.51 | Sodium hydrogen-phosphite | 200 | Sodium hydroxide | 2 | Reduced pressure | 2.23 | 90 |
| 20 | Phthalic acid | 0.51 | Phosphorous acid | 200 | Sodium hydroxide | 8 | Reduced pressure | 1.53 | 44 |
| 21 | Phthalic acid | 0.51 | Phosphorous acid | 500 | Sodium hydroxide | 2 | Reduced pressure | 2.18 | 98 |
| 22 | Phthalic acid | 2.00 | Phosphorous acid | 200 | Sodium hydroxide | 2 | Reduced pressure | 1.45 | 130 |
| 23 | Phthalic acid | 0.51 | Sodium dimethyl-phosphinate | 200 | Sodium hydroxide | 2 | Reduced pressure | 2.19 | 110 |

Note: *) percents by weight to the polyamide;

**) the denomination of the amount is as defined in Example 1.

Patent No. 3,872,055  Page 5

In Columns 13 and 14 Table 9 should read:

Table 9

| No. | Component (C) | Additives Amount | Phosphorus compound | Amount | Alkali metal compound | Amount | Polymerization condition | Solution viscosity | Gelation time (hrs.) |
|---|---|---|---|---|---|---|---|---|---|
| 1 | Not added | - | Not added | - | Not added | - | Atmospheric pressure | 2.70 | 27 |
| 2 | Not added | - | Hypophosphorous acid | 200 | Lithium hydroxide | 3 | Atmospheric pressure | 2.72 | 50 |
| 3 | Not added | - | Phosphorous acid | 200 | Lithium hydroxide | 3 | Atmospheric pressure | 2.72 | 49 |
| 4 | Phthalic anhydride | 0.45 | Not added | - | Not added | - | Reduced pressure | 2.70 | 48 |
| 5 | 1,2-Cyclohexane-dicarboxylic acid anhydride | 0.38 | Not added | - | Not added | - | Reduced pressure | 2.70 | 45 |
| 6 | 1,2-Cyclohexane-dicarboxylic acid anhydride | 0.38 | Phenylphosphonous acid | 200 | Potassium hydroxide | 2 | Reduced pressure | 2.71 | 120 |
| 7 | 1,2-Cyclohexane-dicarboxylic acid anhydride | 0.38 | Phenylphosphonic acid | 200 | Potassium hydroxide | 2 | Reduced pressure | 2.72 | 120 |
| 8 | Phthalic acid | 0.51 | Sodium hypophosphite | 200 | Sodium hydroxide | 2 | Reduced pressure | 2.72 | 124 |
| 9 | Phthalic acid | 0.51 | Potassium hydrogen phosphite | 200 | Potassium methoxide | 2 | Reduced pressure | 2.72 | 125 |

Patent No. 3,872,055

Table 9-continued

| | | | | | | | |
|---|---|---|---|---|---|---|---|
| 10 | Phthalic anhydride | 0.45 | Phosphorous acid | 200 | Not added | — | Reduced pressure | 2.88 | 37 |
| 11 | Phthalic anhydride | 0.45 | Phenylphosphonous acid | 50 | Sodium hydroxide | 2 | Reduced pressure | 2.70 | 53 |

Note: the denomination of the amount is as defined in Example 8.

3,872,055　　　　　　　　　　　　　Page 7

Columns 13 through 16, Table 10 should read:

Table 10

| No. | Additives | | | | | | Polymerization condition | Solution viscosity | Gelation time (hrs.) |
|---|---|---|---|---|---|---|---|---|---|
| | o-Phenylenediamine compound | Amount*) | Phosphorus compound | Amount**) | Alkali metal compound | Amount**) | | | |
| 1 | Not added | – | Not added | – | Not added | – | Atmospheric pressure | 2.23 | 18 |
| 2 | Not added | – | Phenylphosphonous acid | 200 | Not added | – | Atmospheric pressure | 2.25 | 16 |
| 3 | Not added | – | Phenylphosphonous acid | 200 | Sodium hydroxide | 2 | Atmospheric pressure | 2.23 | 38 |
| 4 | Not added | – | Sodium hypophosphite | 200 | Sodium hydroxide | 3 | Atmospheric pressure | 2.24 | 37 |
| 5 | Not added | – | Phenylphosphonic acid | 200 | Sodium hydroxide | 2 | Atmospheric pressure | 2.23 | 38 |
| 6 | Not added | – | Phosphorous acid | 200 | Sodium hydroxide | 3 | Atmospheric pressure | 2.23 | 38 |
| 7 | o-Phenylenediamine | 0.45 | Not added | – | Not added | – | Reduced pressure | 2.24 | 37 |
| 8 | m-Xylylenediamine | 0.39 | Not added | – | Not added | – | Reduced pressure | 2.23 | 15 |
| 9 | 2-Ethylhexylamine | 0.32 | Not added | – | Not added | – | Reduced pressure | 2.23 | 23 |
| 10 | o-Phenylenediamine | 0.45 | Phenylphosphonous acid | 200 | Sodium hydroxide | 2 | Reduced pressure | 2.23 | 82 |

Patent No. 3,872,055  
Page 8

Table 10- continued

| | | | | | | | | | |
|---|---|---|---|---|---|---|---|---|---|
| 11 | 3-Methyl-o-phenylenediamine | 0.51 | Phenylphosphonous acid | 200 | Sodium hydroxide | 2 | Reduced pressure | 2.25 | 85 |
| 12 | 2-Ethylhexylamine | 0.32 | Phenylphosphonous acid | 200 | Sodium hydroxide | 2 | Reduced pressure | 2.22 | 43 |
| 13 | o-Phenylenediamine | 0.45 | Phenylphosphonic acid | 200 | Lithium hydroxide | 2 | Reduced pressure | 2.24 | 79 |
| 14 | o-Phenylenediamine | 0.45 | Hypophosphorous acid | 200 | Sodium methoxide | 3 | Reduced pressure | 2.23 | 88 |
| 15 | o-Phenylenediamine | 0.45 | Phosphorus acid | 200 | Sodium methoxide | 3 | Reduced pressure | 2.23 | 85 |
| 16 | o-Phenylenediamine | 2.00 | Sodium hypophosphite | 200 | Sodium hydroxide | 3 | Reduced pressure | 1.41 | 123 |
| 17 | o-Phenylenediamine | 0.45 | Sodium hypophosphite | 200 | Sodium hydroxide | 8 | Reduced pressure | 1.55 | 50 |
| 18 | o-Phenylenediamine | 0.45 | Sodium hypophosphite | 500 | Sodium hydroxide | 2 | Reduced pressure | 2.16 | 100 |
| 19 | o-Phenylenediamine | 0.45 | Sodium hypophosphite | 30 | Sodium hydroxide | 2 | Reduced pressure | 2.23 | 40 |
| 20 | o-Phenylenediamine | 0.45 | Sodium hypophosphite | 200 | Not added | — | Reduced pressure | 2.27 | 35 |
| 21 | o-Phenylenediamine | 0.45 | Phenylphosphinic acid | 200 | Sodium hydroxide | 2 | Reduced pressure | 2.22 | 105 |

UNITED STATES PATENT OFFICE
CERTIFICATE OF CORRECTION

Patent No. 3,872,055      Dated March 18, 1975

Inventor(s) Kaoru Furukawa et al.      Page 9

It is certified that error appears in the above-identified patent and that said Letters Patent are hereby corrected as shown below:

Table 10-footnote continued

Note: The denomination of the amount is as defined in Example 8.

Signed and Sealed this third Day of February 1976

[SEAL]

Attest:

RUTH C. MASON
*Attesting Officer*

C. MARSHALL DANN
*Commissioner of Patents and Trademarks*